US012614685B2

(12) United States Patent
McCord

(10) Patent No.: US 12,614,685 B2
(45) Date of Patent: Apr. 28, 2026

(54) DEVICE, SYSTEM, AND METHOD FOR HIGH VOLTAGE SWITCH

(71) Applicant: Power Grid Components, Inc., Bessemer, AL (US)

(72) Inventor: Neil A. McCord, Athens, GA (US)

(73) Assignee: Power Grid Components, Inc., Bessemer, AL (US)

(*) Notice: Subject to any disclaimer, the term of this patent is extended or adjusted under 35 U.S.C. 154(b) by 214 days.

(21) Appl. No.: 18/457,853

(22) Filed: Aug. 29, 2023

(65) Prior Publication Data

US 2024/0071699 A1 Feb. 29, 2024

Related U.S. Application Data

(60) Provisional application No. 63/402,038, filed on Aug. 29, 2022.

(51) Int. Cl.

*H01H 33/662* (2006.01)
*H01H 33/664* (2006.01)
*H01H 33/666* (2006.01)

(52) U.S. Cl.

CPC .... *H01H 33/66261* (2013.01); *H01H 33/664* (2013.01); *H01H 33/666* (2013.01)

(58) Field of Classification Search

CPC ........... H01H 33/66261; H01H 33/664; H01H 33/666; H01H 33/66207; H01H 33/6623; H01H 33/662; H01H 2033/66284

USPC ....... 218/118, 120, 134, 136, 138, 139, 142, 218/147

See application file for complete search history.

(56) References Cited

U.S. PATENT DOCUMENTS 3,812,314 A 5/1974 Nonken
3,955,167 A 5/1976 Kumbera
4,124,790 A 11/1978 Kumbera et al.
4,618,749 A * 10/1986 Bohme ............ H01H 33/66207 218/134
4,920,446 A 4/1990 Pflanz
5,387,772 A 2/1995 Bestel
5,597,992 A 1/1997 Walker
5,698,831 A 12/1997 Abdelgawad et al.

(Continued)

FOREIGN PATENT DOCUMENTS

CN 1619744 * 5/2005 ........... H01H 33/666

OTHER PUBLICATIONS

Translation of CN1619744 (Original document published May 25, 2005) (Year: 2005).*

(Continued)

*Primary Examiner* — William A Bolton

(74) *Attorney, Agent, or Firm* — Levenfeld Pearlstein, LLC

(57) ABSTRACT

Devices, systems, and methods are provided for a high voltage switch. The device can include a first housing, a switch, and a polymer insulating material. The housing can be at ground potential. The switch can be located within the housing and can include a current-breaking component and a moving contact. The current-breaking component can include a fixed contact and an opening contact. The fixed contact can be coupled to a first power lead. The opening contact can be configured to receive a moving contact. The moving contact can be coupled to a second power lead and can be controlled by an actuating mechanism. The polymer insulating material can surround the switch within the housing.

18 Claims, 12 Drawing Sheets

(56) References Cited

U.S. PATENT DOCUMENTS

| | | | |
|---|---|---|---|
| 5,917,167 A | 6/1999 | Bestel | |
| 6,194,986 B1 | 2/2001 | Weatherbee et al. | |
| 6,364,216 B1 | 4/2002 | Martin | |
| 6,747,234 B2 * | 6/2004 | Traska | H01H 33/666 218/139 |
| 6,783,401 B2 | 8/2004 | Wilson et al. | |
| 6,788,515 B1 | 9/2004 | Martin | |
| 6,888,086 B2 * | 5/2005 | Daharsh | H01C 7/12 218/138 |
| 7,285,743 B2 | 10/2007 | Martin | |
| 7,327,213 B2 | 2/2008 | Martin et al. | |
| 8,110,770 B2 | 2/2012 | Ichikawa et al. | |
| 8,497,446 B1 | 7/2013 | Glaser | |
| 9,190,231 B2 * | 11/2015 | Borgstrom | H01H 33/662 |
| 9,691,574 B2 * | 6/2017 | Gerovac | H01H 33/66207 |
| 10,102,989 B2 * | 10/2018 | Hartmann | H01H 33/662 |
| 10,262,820 B2 * | 4/2019 | Phillpotts | H01H 89/00 |
| 10,453,633 B2 * | 10/2019 | Wang | H01H 33/66261 |
| 2005/0077994 A1 | 4/2005 | Martin et al. | |
| 2005/0082260 A1 | 4/2005 | Martin | |
| 2006/0096856 A1 | 5/2006 | Martin | |
| 2014/0374383 A1 * | 12/2014 | Shioiri | H01H 33/66207 218/139 |
| 2015/0027986 A1 * | 1/2015 | Siebens | H01H 33/42 29/622 |
| 2020/0118776 A1 * | 4/2020 | Kowalyshen | H01H 33/6662 |

OTHER PUBLICATIONS

Yukihiro Takeshita et al., “Development of 72/84-kV Dry Air-Insulated Dead Tank VCB, Electrical Engineering in Japan”, vol. 177, No. 1, 2011, 10 pages.

* cited by examiner

DEVICE, SYSTEM, AND METHOD FOR HIGH VOLTAGE SWITCH

CROSS-REFERENCE TO RELATED APPLICATION

This application is based upon and claims priority to U.S. provisional patent application No. 63/402,038 filed on Aug. 29, 2022, the entire contents of which are incorporated herein by reference in its entirety for all purposes.

BACKGROUND

This disclosure is related to a high voltage vacuum switch.

A switch or circuit breaker is an electrical component that switches either manually or automatically to control a power system. All buildings with electricity must have circuit breakers. A circuit breaker can save a premises and employees from shock, electrical fire, or even electrocution.

Circuit breakers offer electrical protection to people and equipment from sudden surges, overloads, and short circuits. Circuit breakers fall into several classifications.

Circuit breakers can be classified according to different mechanisms. The criteria that can be used to classify circuit breakers include voltage, interruption mechanism, installation location, features or design as non-limiting examples. Voltage circuit breakers are classified according to their voltage rating. The amount of power that can pass through the breaker can determine the type or category of a circuit breaker. Generally, three main voltage categories exist for circuit breakers: High-voltage circuit breakers, Medium-voltage circuit breakers, Low-voltage circuit breakers.

Different types of circuit breaker types are suited for different applications. High voltage circuit breakers are typically utilized when the voltage rises above 72,000 volts. High voltage circuit breakers are not the type that are commonly seen inside or on the outside wall of a building. These circuit breakers use solenoids that are usually operated by current transformers and protective relays.

High voltage circuit breakers are used in a system with very high voltage such as power transmission lines. They are very complex but highly capable of minimizing overcurrent.

To break the arc, these circuit breakers use different methods such as oil, air blast, carbon dioxide, or vacuum. However, sulfur hexafluoride has become more popular.

Medium-Voltage circuit breakers handle less voltage than their high-voltage counterparts. Generally, they are used for voltage between 1,000 and 72,000 volts. Also, they can be installed for both indoor and outdoor use. Medium-voltage circuit breakers help in monitoring medium voltages and use protective relays to check any dangerous abnormalities.

Low-voltage circuit breakers are typically seen around a workplace, home or building. These are the same basic type of circuit breakers that can be purchased at the hardware store.

The interruption mechanism is how the circuit breakers cut the flow of current. Different circuit breakers function differently from the others. There are generally four types of interruption mechanisms: Air circuit breakers, Oil circuit breakers, Sulfur hexafluoride circuit breakers, Vacuum circuit breakers.

Each method has different advantages when breaking an arc.

For air circuit breakers, including air blast or air magnetic circuit breakers, air is the primary insulating and interrupting mechanism. When breaking the current, an air circuit breaker uses a combination of air pressure and magnetic/conductive elements to safely contain the arc until it is eliminated.

Magnetic breakers interrupt the arc using the magnetic field as interruption medium.

Air blast circuit breakers use a blast of the air. This blast blows out the arc with compressed air stored in nozzles. This air is released through the vents thus producing a high-velocity jet which extinguishes the arc.

For oil circuit breakers, mineral oil is most often used to break the arc. Oil is highly preferable to air because of its insulating properties. Both the fixed and moving contacts are immersed in the oil.

During the breaking of the circuit, the arc is initialized at the point of separation. The arc in the oil is decomposed and vaporized as hydrogen gas, which finally creates a hydrogen bubble. The compressed hydrogen gas prevents the re-striking of the arc as the current reaches zero. Oil circuit breakers are the oldest known breakers. There are two types of oil circuit breakers, namely, minimum oil and bulk oil, or tank circuit breakers. The minimum oil circuit breakers utilize oil during the interruption. This circuit breaker uses a minimal amount of oil since there is an insulating media between the current carrying contacts and the earth parts. The insulating material is available in the interrupting chamber and requires minimal oil. The bulk oil circuit breaker uses oil as both the insulating and quenching media. When the current carrying contacts are separated, the arc is generated between the contacts. This arc produces a rapid gas bubble around it, thus moving the contacts away.

Oil Circuit Breakers can be classified according to their structural designs. This category has two types of circuit breakers: Live tank circuit breakers and Dead tank circuit breakers.

These two circuit breaker types have a different construction. Dead tank circuit breakers are currently the most preferred in the US. This circuit breaker has an enclosed tank at its ground. The tank encloses the insulating and interruption mediums. A live tank breaker has the tank above the ground. This tank houses the insulation medium between it. The dead tank model offers higher seismic withstand capability because it's near the ground. In live tank circuit breakers, the enclosure that houses the contacts is energized, i.e., "live". Dead tank circuit breaker's contact enclosures are not energized and are connected to the ground grid. Live tank breakers are less expensive than dead tank breakers and require less space.

Sulfur hexafluoride circuit breakers utilize Sulfur Hexafluoride ($SF_6$) gas to extinguish the arc. This gas has a great extinguishing property. Many manufacturers prefer sulfur hexafluoride gas over oil and air. Sulfur hexafluoride has high electronegativity which can be ideal for insulation. It has about twice the insulating property as air. It is useful in both medium to high voltage electrical systems. $SF_6$ gas has excellent insulating, arc extinguishing and many other properties which are the greatest advantages of $SF_6$ circuit breakers.

Vacuum circuit breakers utilize a vacuum medium to extinguish the arc in the interrupter mechanism. The vacuum has a dielectric recovery character that provides excellent interruption, especially during the high-frequency current. This interruption mechanism uses electrodes that remain closed during normal operation.

When a fault is identified in the system, the trip gets energized, thus breaking the contact. When the electrodes open, an arc is produced by the ionization of the contacts. The arc then quickly extinguishes because the electrons and ions condense on the surface of the electrons. This result in the recovery of the dielectric strength.

Circuit breakers are used in different installations. Depending on the requirements, they can be installed indoors or outdoors. Indoor circuit breakers are designed to be installed in protected enclosures. These breakers should be installed in buildings for protection from weather conditions. Metal clad switchgear enclosures operate the indoor circuit breakers at medium voltage.

On the other hand, outdoor circuit breakers do not require any protection or roofing. They have stronger enclosure arrangements compared to their indoor counterparts. They are unaffected by wear and tear and are used for more complex power systems. The only difference between these two models is that outdoor breakers are enclosed. The circuit interruption mechanism is the same for both types.

SF6 breakers have steadily improved since the 1960's to become the state of the art for many utility companies. One disadvantage however is gas leakage—mainly the difficulty associated with sealing a pressure vessel with a rotating or sliding seal for thirty or more years without refilling or leaking. In addition, new regulations from the Environmental Protection Agency are aimed at reducing emission of SF6 as a potent greenhouse gas. As a result of such regulations, suppliers have begun turning to switches comprising a vacuum interrupter with air insulation. Air however is not as effective of an insulator as SF6. Therefore, the vacuum interrupter with air insulation have to be larger and more expensive than the SF6 competitors. In other words, air-insulated vacuum interrupter breakers can cost more than the traditional SF6 breakers without offering any performance or maintenance advantages. More particularly, if either design leaks the resulting loss of dielectric strength activates the low gas lock out relay rendering the breaker inoperable until a maintenance crew is able to come out and repair the breaker.

Accordingly, it is desirable to provide an entirely new and improved high voltage vacuum switch for use in connection with high voltage circuit breakers, electrical transmission equipment and distribution systems. It is further desirable for such new switch to not require pressurized vessels, a gas monitoring system, rupture discs, or low gas lock outs or alarms in the control system. It is further desirable for such technology to avoid the possibility and hazards associated with SF6 leaks. Embodiments disclosed herein are directed to addressing such needs and others as may be contemplated or recognized by the following disclosure.

BRIEF SUMMARY

In view of this, the present disclosure provides a device, system, and method for a high voltage switch according to various embodiments.

According to a first aspect of the present disclosure. The device can include a first housing, a switch, and a polymer insulating material. The housing can be at ground potential. The switch can be located within the housing and can include a current-breaking component and a moving contact. The current-breaking component can include a fixed contact and an opening contact. The fixed contact can be coupled to a first power lead. The opening contact can be configured to receive a moving contact. The moving contact can be coupled to a second power lead and can be controlled by an actuating mechanism. The polymer insulating material can surround the switch within the housing.

According to a second aspect of the present disclosure. The system can include a first housing, a first bushing, a second busing, a switch, and a polymer insulating material. The housing can be at ground potential. The first busing can be coupled to a first power lead. The second bushing can be coupled to a second power lead. The switch can be located within the first bushing and can include a current-breaking component and a moving contact. The current-breaking component can include a fixed contact and an opening contact. The fixed contact can be coupled to the first power lead through the first bushing. The opening contact can be configured to receive the moving contact. The moving contact can be coupled to a second power lead through the second bushing and can be controlled by an actuating mechanism. The polymer insulating material can surround the switch and the moving contact within the first housing.

According to a third aspect of the present disclosure, there is provided a method for operating a high voltage switch. The method may include providing a high voltage electrical current through a grounded housing, determining an over-current occurs between a first and second power lead, and switching off the high voltage electrical current using a switch. The grounded housing can include the first and second power lead coupled to a power supply, a switch, and a polymer insulating material. The switch can include a current-breaking component and a moving contact. The current-breaking component can include a fixed contact and an opening contact. The fixed contact can be coupled to the first power lead. The opening contact can be configured to receive the moving contact. The moving contact can be coupled to the second power lead and can be controlled by the actuating mechanism. The polymer insulating material can surround the switch and the moving contact within the housing.

The foregoing general description and the following detailed description are examples only and are not restrictive of the present disclosure.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
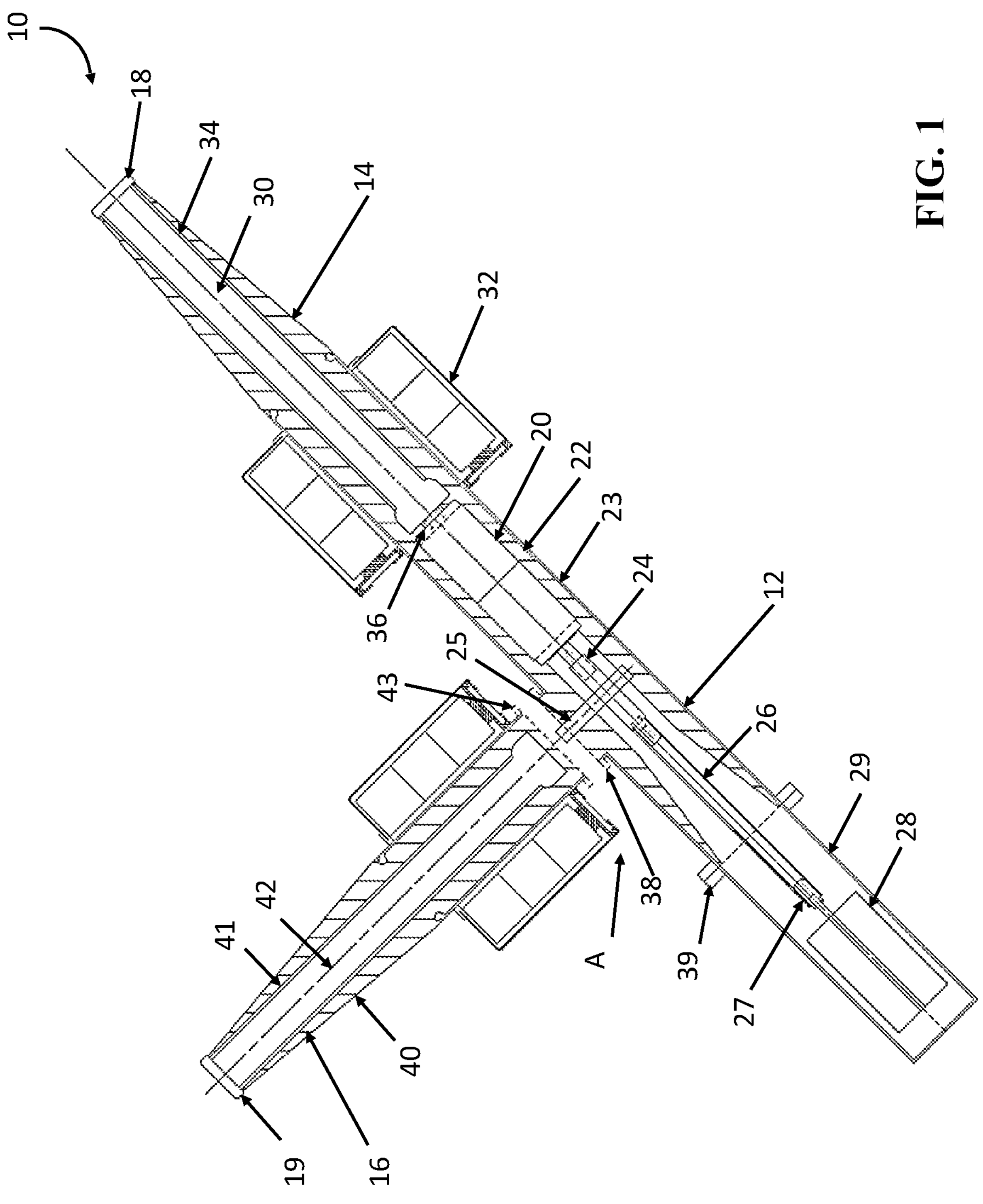
FIG. 1 is a perspective cross-section diagram of a high-voltage switch, according to an embodiment.

While the present disclosure is susceptible of embodiment in various forms, there is shown in the drawings and will hereinafter be described presently preferred embodiments with the understanding that the present disclosure is to be considered an exemplification and is not intended to limit the disclosure to the specific embodiments illustrated. The words “a” or “an” are to be taken to include both the singular and the plural. Conversely, any reference to plural items shall, where appropriate, include the singular. The words “first,” “second,” “third,” and the like may be used in the present disclosure to describe various information, such information should not be limited to these words. These words are only used to distinguish one category of information from another. The directional words “top,” “bottom,” up,” “down,” front,” “back,” and the like are used for purposes of illustration and as such, are not limiting. Depending on the context, the word “if” as used herein may be interpreted as “when” or “upon” or “in response to determining.”

The present disclosure relates to a high-voltage switch. The high-voltage switch can be a high-voltage circuit breaker that cuts off current when overcurrent occurs. In similar embodiments, the present disclosure includes high-voltage circuit breakers, high-voltage bushings, high-voltage to air interface in a grounded housing and methods for manufacturing these high-performance components.

In an embodiment, a high-voltage vacuum circuit breaker (HVVCB) can include a solid insulation that is free of insulating and arcing gasses. The dead tank (grounded housing) style high voltage circuit breaker is the most popular in North America. The grounded housing allows the installation of bushing current transformers at the base of each bushing, a necessary component for the utility substation relay and protection scheme. The mechanism can be capable of independent pole operation.

In an embodiment, the HVVCB may include an encapsulation of a vacuum interrupter with solid insulation in a conductive grounded housing.

In some embodiments, due to the use of a grounded housing, a novel process of molding is utilized. In this case the grounded housing can be the outside of the mold, and the actual mold tooling can be attached to the ends of the assembly to shape the insulators as they interface with the air.

Another embodiment can include a high voltage circuit breaker bushing with solid insulation. Another embodiment can include an air insulated, low pressure, connection from the mechanism to the interrupter.

According to embodiments presented herein, a solid polymer insulation system or polymer insulating material can be used between the vacuum interrupter and the high-voltage current carrying parts to the grounded tank. A vacuum interrupter can have the full high-voltage electrical capabilities required of a circuit breaker on the inside of the vacuum chamber. On the other hand, the outside of the vacuum interrupter does not have the required electrical properties to withstand the high voltages in air. Therefore, a vacuum interrupter used in a circuit breaker must have an insulation system around it that reduces the electric field strength in the air.

Currently, for outdoor equipment, high-voltage circuit breakers use insulating gas in aluminum tanks while medium-voltage breakers cast polymers over the vacuum interrupter without the grounded aluminum housing. According to embodiments presented herein, the solid insulation can be casted around the vacuum interrupter while in a grounded aluminum housing.

Embodiment presented herein can contain the electrical fields in a grounded conductive housing with a solid insulation system to control the electric field strength. The dielectric strength of polymers can be eight times greater than air, therefore the grounded housing can be able to have a diameter less than half the diameter of the traditional gas tanks. The vacuum interrupter can be located in the center of the housing and the space between the interrupter and the housing can be filled with a void free solid insulation, such as, for example a polymer insulating material. In an embodiment, the dielectric strength of air can be 3 kV/mm at standard temperature and pressure (STP). The dielectric strength of the polymer can be 23 kV/mm. The ratio is 23/3=7.7. To increase the performance of the air, manufacturers can increase the pressure to approximately 5 atmospheres. This can reduce the required diameter of the air pressure vessel.

Selecting a proper solid polymer insulation can be particularly important. Generally, for optimal operation, the insulation should be void free, have rubber like properties to work with the expansion and contraction of the materials in the assembly and be useable for the line to ground insulation bushing. According to embodiments presented herein, the insulation materials can be an electrical grade castable silicone rubber and/or urethane.

On the moving side of the vacuum bottle, near the moving contact 24 (FIG. 1), there can be a sealed pocket of either air or vacuum, to allow the operation of the moving side of the vacuum interrupter. If the pocket is sealed with air, it can be under one atmosphere (atm) pressure to avoid being a pressure vessel. Since this pressure is below one atm there is no need for gages or monitoring.

Each interrupter pole can have its own mechanism for the O-CO (open, close-open) operation. The choice of the independent pole operating mechanism can allow for a compatibility with synchronous operating controllers for capacitor switching, reactor switching and specialized transformer switching. The present disclosure can also be modified to use a common “gang style” operating mechanism.

Currently, for low to medium voltage systems, it is common to insulate vacuum interrupters in urethane, silicone or epoxy in a dead tank. The design approach according to embodiments presented herein is similar to the Shielded Encapsulated Vacuum Interrupter patent (Martin, 2005). One key difference includes the use of a different solid insulation together with a grounded housing for a high-voltage system, which can present unique challenges from the standpoint of manufacturing and system operation. More particularly, the solid insulation may require void free manufacturing and the system may require the ability to contain and operate under high heat. The grounded housing can make a material difference in the performance and size and can enable use as a high-voltage circuit breaker using solid insulation.

FIG. 1 is a diagram of a full single pole high-voltage switch design 10 with current transformers. According to example embodiments shown schematically in FIG. 1, the design 10 can include a primary assembly 12, a first bushing 14, a second bushing 16, a first power lead 18, a second power lead 19, a vacuum interrupter 20, a polymer insulation material 22, a first grounded housing 23, a moving conductor 24, a sliding electrical conductor 25, an insulated operating rod 26, a holding force spring assembly 27, a magnetic actuator 28, a mechanism housing 29, a first bushing center conductor 30, a bushing current transformer assembly 32, a first to ground insulator system 34, a fixed conductor 36, a first flange 38, a second grounded housing 40, a second line to ground insulator system 41, a second bushing center conductor 42, and a second flange 43.

The polymer insulation material 22 can be liquid silicone rubber. The polymer insulating material 22 can be coupled to the interior walls of the housing 23, 40 and/or the outer surface of the vacuum interrupter 20 and conductors 30, 42. It can surround the interrupter 20 and the moving conductor 24. According to embodiments presented herein, the polymer insulating material 22 can further surround the sliding operating rod 26 and taper near an outer end of the housing.

The first bushing 14 can include the first conductor 30 that couples the fixed contact 36 to a first power lead 18 (or first bushing top cap that connects to the first power lead). The second bushing 16 can include the second conductor 42 that couples the moving contact 25 to the second power lead 19 (or second bushing top cap that connects to a second power lead). According to embodiments shown schematically in FIG. 1 the first and/or second bushing 14, 16 can be separable from the housing 12.

According to embodiments presented herein, the design 10 can be part of a high-voltage circuit breaker that is activated when there is an over-current detected. In one embodiment, the actuating mechanism 28 can be activated to disconnect the moving contact 24. In another embodiment, the design 10 can be part of a high-voltage switch that is activated by a user or other device. In such an embodiment, the actuating mechanism 28 can be activated to connect or disconnect the moving contact 24.

According to embodiments presented herein, the polymer 22 can include electrical grade silicone rubber, silicone rubber foams, urethanes, urethane foams, epoxies, epoxy foams, or a blend of these materials. The urethanes and epoxies can include rigid, semi flexible, or flexible with or without insert fillers. The polymer 22 can further include liquid castable thermoset plastics that cure after mixing with heat or room temperature. The polymer 22 can have a high dielectric strength with a low dielectric constant, it can be void free and able to bond well to metal surfaces with or without primer. Additionally, the polymer material 22 can be low cost, easy to process large castings, flame retardant and have low shrinkage.

Figure 2:
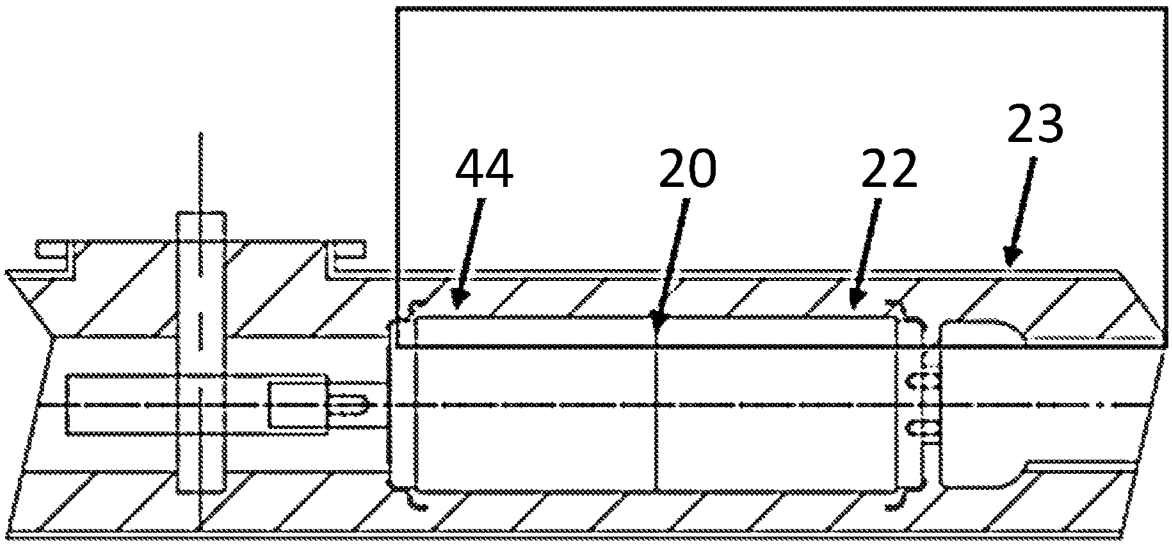
FIG. 2 is a detail cross-section diagram showing the use of dielectric shields at the braze joint on the vacuum interrupter of FIG. 1.

FIG. 2 is a diagram showing the use of dielectric shields at the braze joint on the vacuum interrupter. The vacuum interrupter dielectric shield 44 can be designed to reduce the dielectric field strength at the braze joint of the vacuum interrupter 20 to below the dielectric withstand value of the polymer insulation 22.

Figure 3:
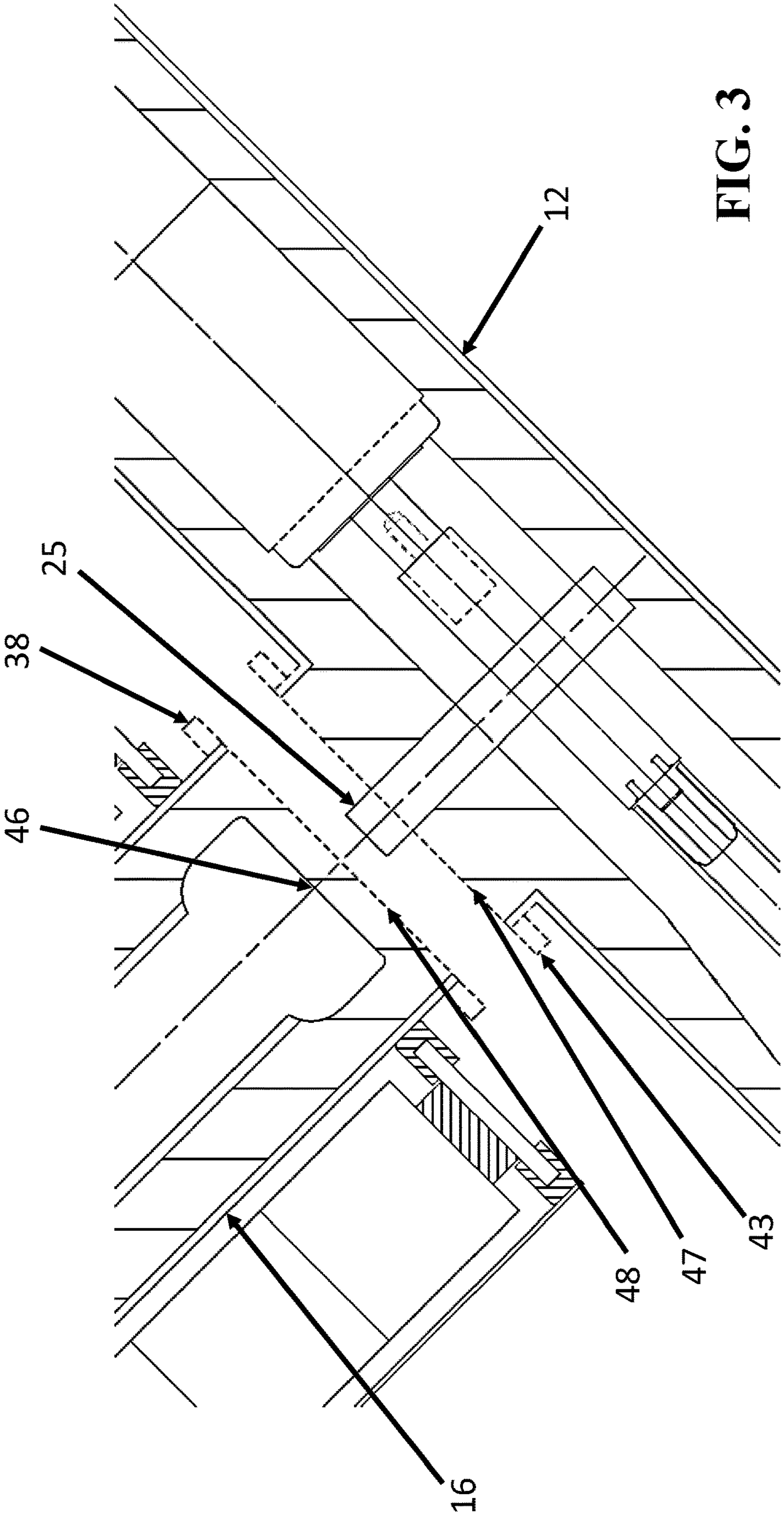
FIG. 3 is a detail cross-section diagram illustrating a separable assembly joint from a first view 'A' of FIG. 1.

FIG. 3 is a diagram illustrating a first view ('A' of FIG. 1) of a separable assembly joint. The separable assembly joint may be used to make the castings in two separate assemblies. The joint may be assembled to leave no voids or air pockets. The joint may carry the full continuous current rating of the circuit breaker, the short-circuit forces and the full short-circuit current. To enable the current to be carried, the post 25 and the connector 46 can make an electrical connection using a tulip and pin or other current carrying socket. The primary assembly surface 47 can be molded flat and smooth to seal the joint and express all of the air from at least the joint. The bushing surface 48 can be molded with a slight convex shape of approximately 1/16" so that the center surface can be the first to contact the primary assembly to enable air to be pushed out as the joint is tightened. The bushing flanges 38, 43 can be a ring of material where bolts are used to pull the assembly together, but the assembly can be made according to other configurations to eliminate the air and voids without departing from the novel scope of the subject invention. One option can be to spread a silicone oil on the surface before assembly to fill in the air gaps and to make the squeezing action smoother. Another approach to eliminate air and voids can involve the use of room temperature vulcanizing rubber on the surface which can cure, whereas silicone oil will not.

In an embodiment, the separable bushing can include no air insulation and instead a polymer, for example, approximately 20 mm in thickness between the current conductor and the grounded housing.

Figure 4:
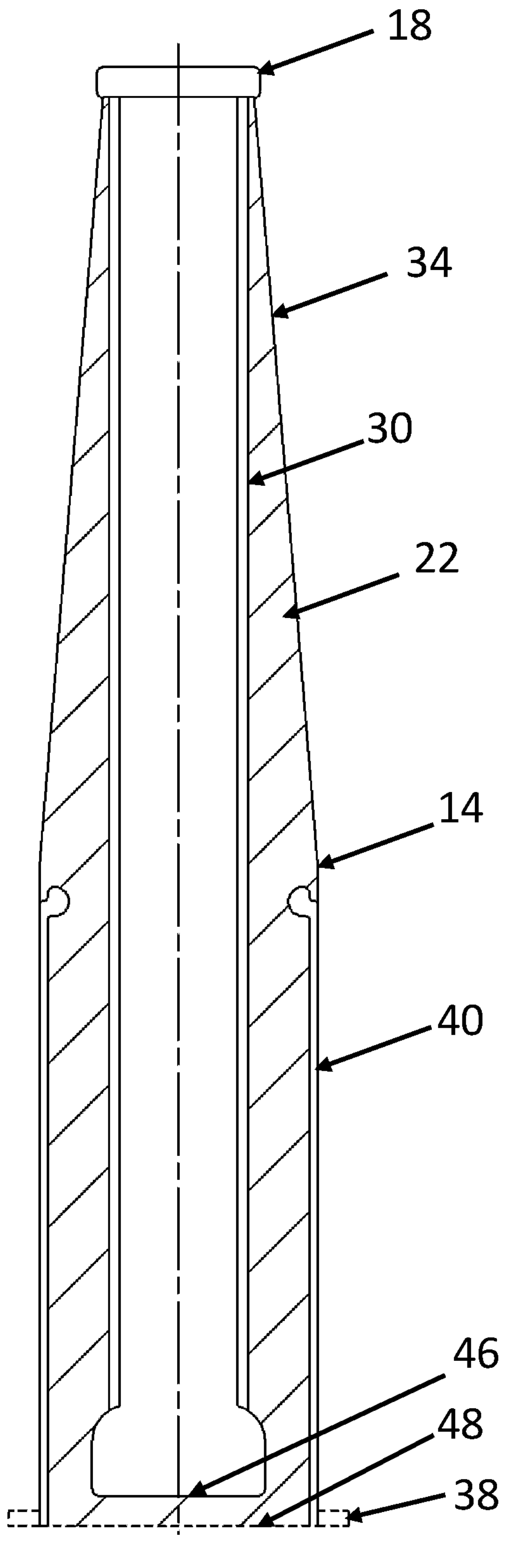
FIG. 4 is a cross-section diagram of a high-voltage bushing, according to an embodiment.

FIG. 4 is a diagram of an exemplary high-voltage bushing. According to embodiments shown schematically in FIG. 4, the bushing assembly can be created by casting with the polymer all in one operation. The bushing housing 40 can have particular importance with reference to embodiments presented herein. Namely, housing 40 can be the primary structure, dielectric ground shield and the primary form for the mold. To mold this assembly a plate can be attached to the bottom that creates the shape of the bushing surface 48. This plate can be attached to the bushing housing 40 by bolting to the flanges 38. To create the line to ground insulator system 34 a mold can be attached to the top of the bushing housing 40 and support the bushing top cap 18. The polymer insulation material 22 can be mixed under vacuum to eliminate gases and allow for a void free process. Before filling the mold with the polymer insulation material 22 the cavity of the mold can be evacuated with a vacuum pump to ensure a void free molding process.

Figure 5:
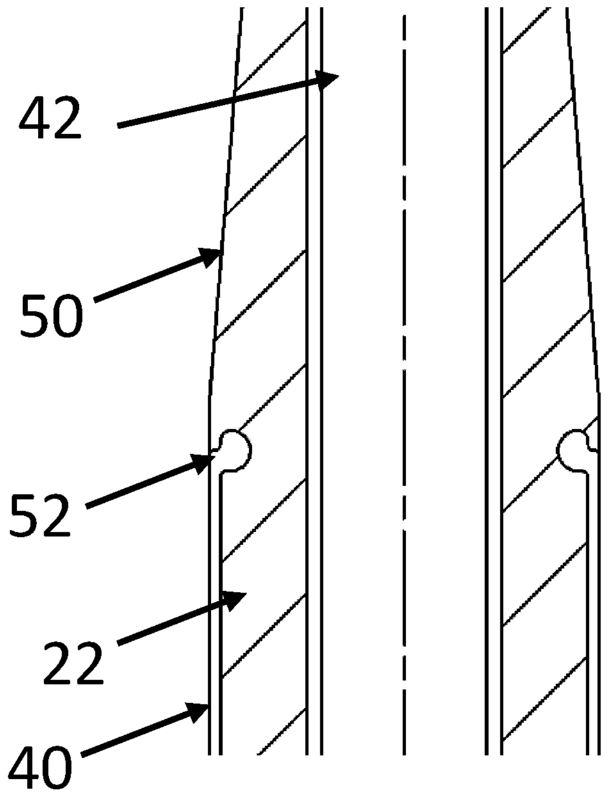
FIG. 5 is a detail cross-section view the high voltage bushing of FIG. 4.

FIG. 5 is a detail cross-section view the high voltage bushing of FIG. 4. According to embodiments shown schematically in FIG. 5 can include a center conductor 42, a solid insulation 50, a dielectric shield 52, a polymer insulation material 22, and a grounded housing 40 (encasing the solid insulation is also the secret sauce).

Figure 7:
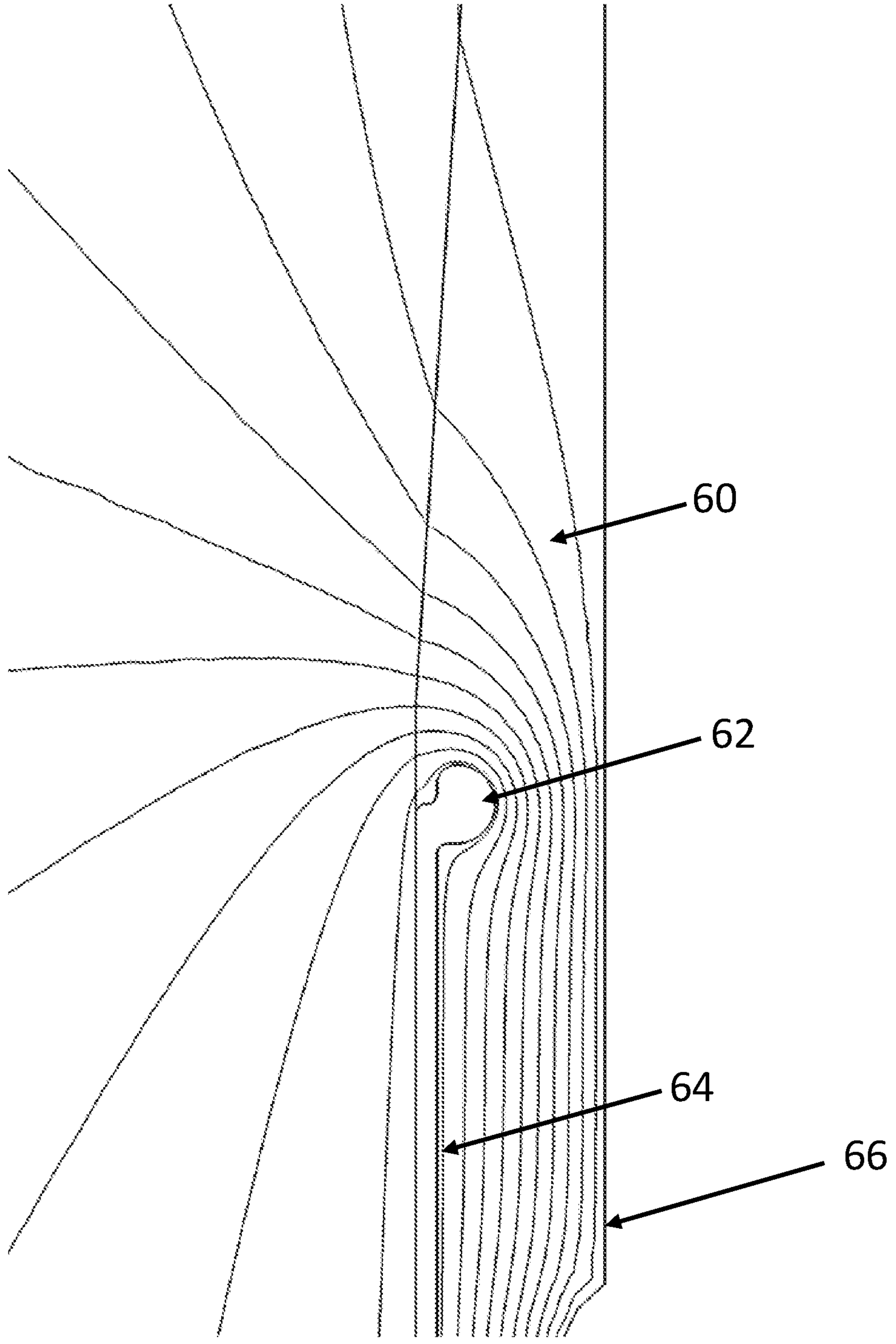
FIG. 7 is a plot showing an electric field strength of a bushing.

FIG. 7 is a plot showing an exemplary electric field strength. This illustration shows an embodiment of the high voltage field lines and how they are shaped by the dielectric field. According to embodiments shown schematically in FIG. 7 can include a high-voltage electric field 60, a high-voltage dielectric shield for shaping the electric field 62, a grounded housing 64, and a conductor surface with high voltage applied 66.

Figure 8:
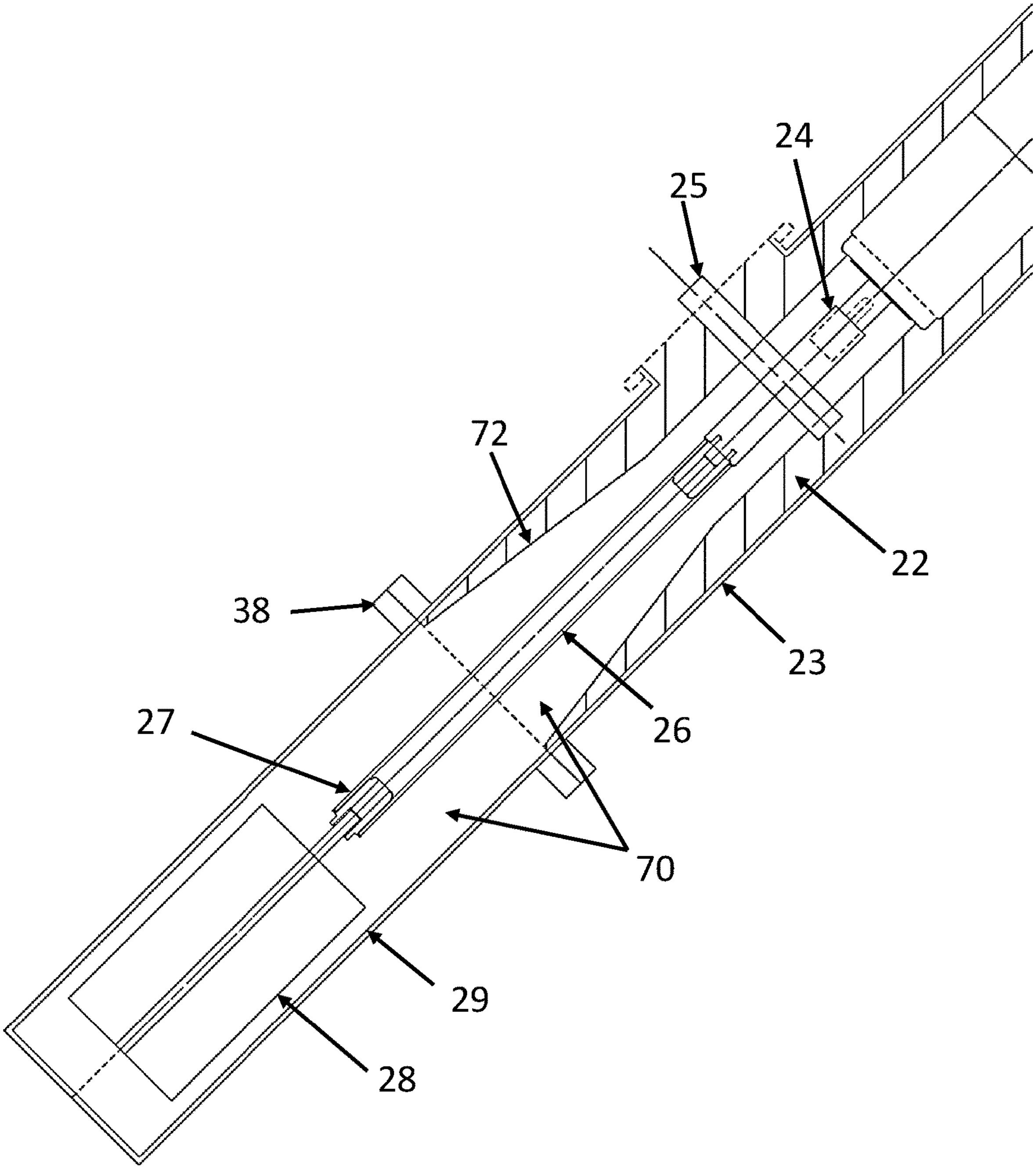
FIG. 8 is a detail cross-section diagram of an interrupter to mechanism air insulation system of the high-voltage switch of FIG. 1.

FIG. 8 is a diagram of an interrupter to mechanism air insulation system. This figure shows the interrupter to mechanism air insulation system. In this illustration, the sliding electrical conductor 25 and the moving conductor 24 are shown at high voltage. The mechanism 28, the holding force spring assembly 27, the mechanism housing 29, and the grounded housing primary 23 all are at ground potential. According to exemplary embodiments shown in FIG. 8, the insulated operating rod 26 can connect and insulate the grounded holding force spring assembly 27 to the moving conductor 24 allowing the mechanism 38 to open and close the contacts in the vacuum interrupter 20.

Figure 9:
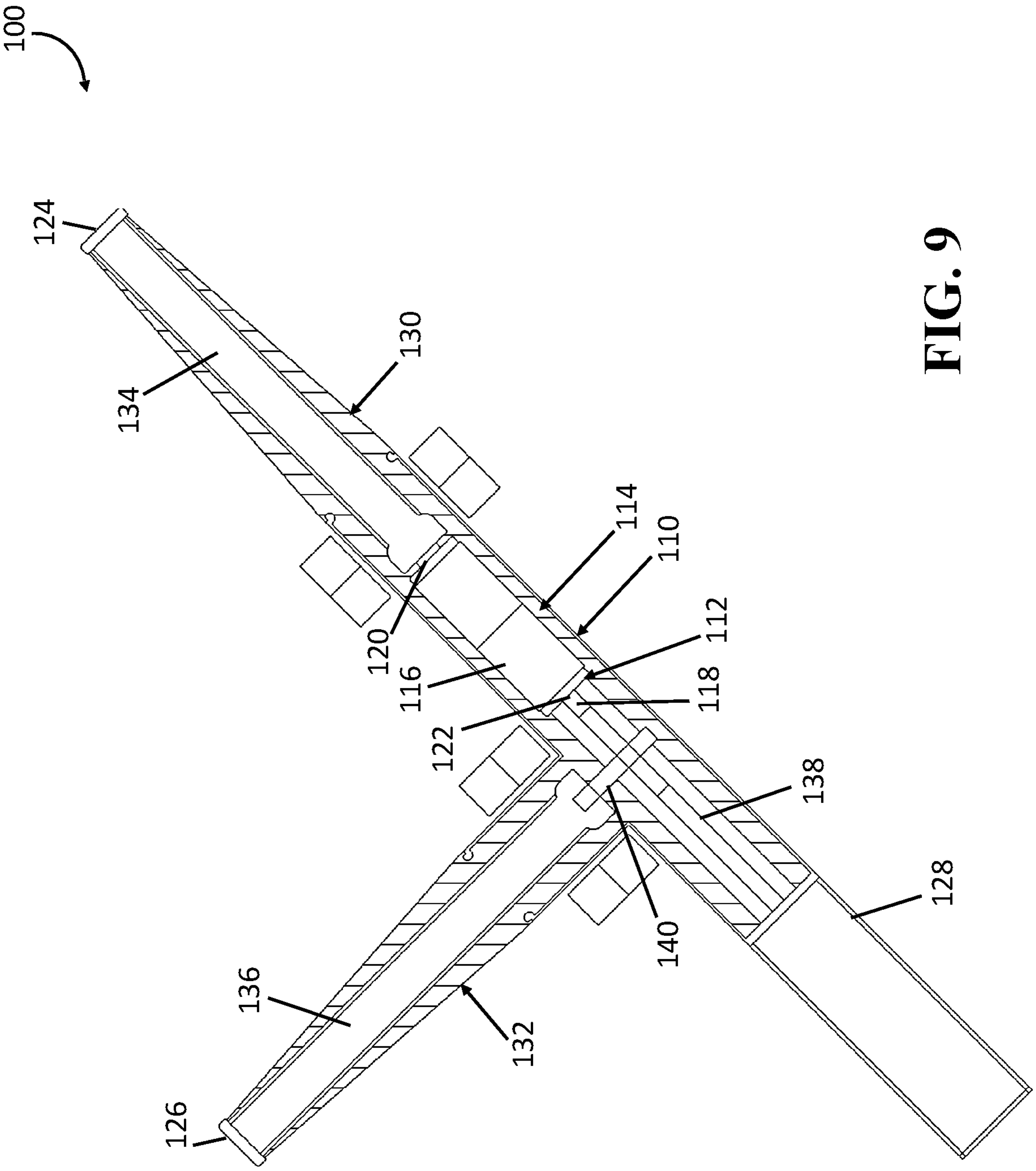
FIG. 9 is a perspective cross-section view illustrating a high-voltage switch, according to an embodiment.

According to embodiments shown schematically in FIG. 8, the polymer insulation material 22 can surround the interrupter and moving conductor 24. Additionally, the polymer insulation material 22 can surround the operating rod and taper off as it extends away from the interrupter. In another, embodiment, the polymer insulation material 22 can extend up to the mechanism 28 (as shown in FIG. 9 below). The housing 23 can further include an atmospheric pressure air gap 70 and a dielectric field control surface 72.

According to embodiments presented herein, it may be advantageous to insulate the high voltage from ground potential. This can be accomplished by carefully designing the dielectric control surface and atmospheric pressure air gap. An advantage of the present disclosure is that it can operate to eliminate the need for gas in circuit breakers at 72 kV and 145 kV. With costs lower than existing designs.

Sulfur hexafluoride ($SF_6$) is a highly potent greenhouse gas that is used in the electric utility industry. In 1999 the United States Environmental Protection Agency (EPA) established the "SF6 Emission Reduction Partnership for Electric Power Systems" with the EPA and electric power industry to reduce $SF_6$ emissions.

For approximately ten years Hitachi/Meiden has offered an $SF_6$ free circuit breaker at 72 kV (and now offers a 145 kV breaker) with a vacuum interrupter with air insulation (VI/air). The industry has been slow to accept this technology reaching less than a 10% market share over the ten years it has been available. This means that with an estimated 2000 total units sold per year, approximately 1800 of them would have $SF_6$.

There are several apparent issues that have slowed the acceptance of the new VI/air technology:

VI/air has a higher cost and selling price than existing $SF_6$ breakers. The dielectric strength of $SF_6$ is about 2.5 times higher than that of air under the same conditions. Therefore, when $SF_6$ is replaced with air as the insulating medium, the gas tanks must be larger and support higher pressures than the present technology $SF_6$ tanks. Such modifications would expectedly increase the cost of the pressurized cast aluminum gas tanks.

VI/air has the same operational risks associated with leaking gas as $SF_6$. Both systems must be sealed and monitored for gas leaks.

Utilities have large quantities of existing $SF_6$ breakers for the foreseeable future at 145 kV, 245 kV, 362 kV, 550 kV and 800 kV. Therefore, these new VI/air breakers will have a small impact on the quantity of $SF_6$ at the utility.

In the various embodiments, a method is utilized to inject the polymer into the space between the vacuum interrupter and high voltage conductors and the grounded housing. This can include casting of the vacuum interrupters (VI) in the grounded housing with associated tooling. Resin Systems has the vacuum mixing, vacuum molding and specialized curing equipment and experience to make these products. As with any new design, special tooling can be used for this casting.

According to embodiments presented herein, a separable bushing with conductor and insulator with gas insulation can be used with a solid insulation. The operating mechanism can be coupled to the moving side of the vacuum interrupter while the interrupter can be in the grounded housing.

The polymer in this system can be void free or minimized to avoid the problems associated with partial discharge. Partial discharge is a phenomenon where small voids or cavities in the insulating materials are stressed by the electric fields in the circuit breaker. When an insulating material experiences partial discharge, i.e., the electric field strength becomes too high for the void, an arc initiates across the void and starts to burn the insulation. These arcs can quickly grow to cause the insulation systems to fail. This has traditionally been a concern and challenge with using solid insulation. To mitigate the risks of partial discharge by the electric fields, the manufacturing process for the solid insulation can include vacuum mixing and vacuum molding. To ensure the quality of the manufacturing of the insulation, partial discharge testing can be used.

Figure 6:
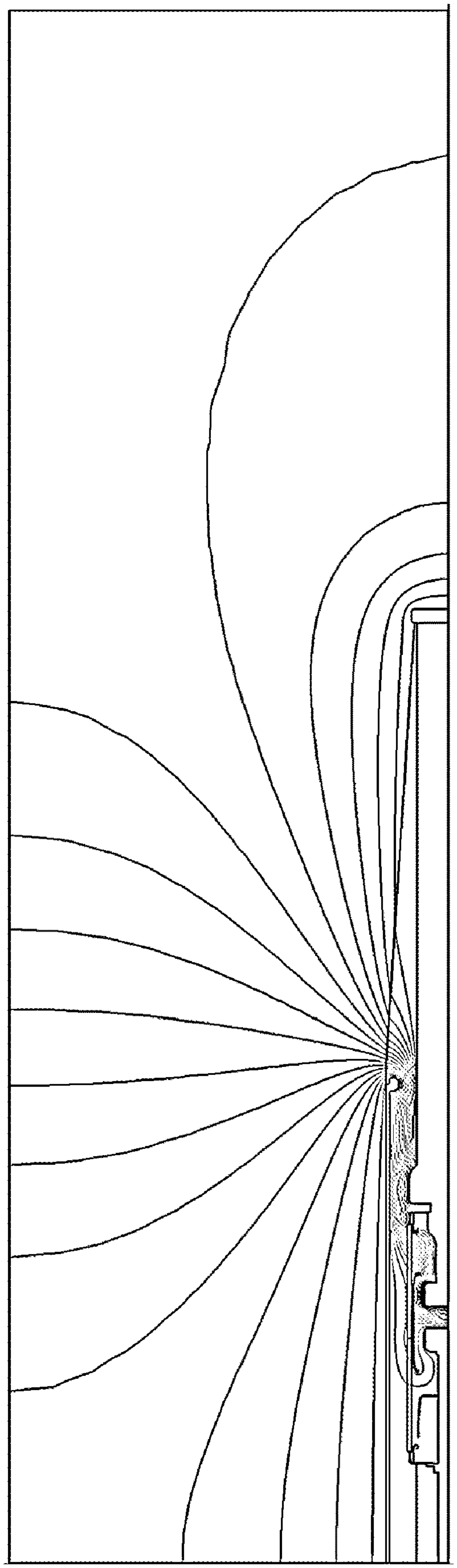
FIG. 6 is a diagram illustrating an example of the electric field strength of the high-voltage switch of FIG. 1.

To ensure the electric field strength is kept within the capabilities of the air and solid insulation the design can be modeled by computer simulations. FIG. 6 is a diagram illustrating an example of the electric field strength. Dielectric testing can be performed per the IEEE standards to confirm the results of the analysis. FIG. 6 illustrates the transition from the grounded housings that support the Bushing Current Transformers to the line to ground insulation.

FIG. 9 illustrates a high-voltage switch 100. According to example embodiments shown schematically in FIG. 9, the high-voltage switch 100 can include a housing 110, a switch 112, and a polymer 114. The housing 110 can be a grounded housing that is, for example, at ground potential. The switch 112 can include a current-breaking component 116 and moving contact 118. The polymer 114 can include a polymer insulating material that surrounds the switch 112 within the housing 110. The current-breaking component 116 can be an interrupter, vacuum interrupter, or similar device that can act as a circuit breaker for high voltage current. The interrupter 116 can include a fixed contact 120 and opening contact 122. The fixed contact 120 can be coupled to a first power lead 124 and the moving contact 118 can be coupled to a second power lead 126. The first and second power lead 124, 126 can provide high-voltage electrical power to an electronic device. The moving contact 118 can be controlled by an actuating mechanism 128 (similar to the mechanism magnetic actuator in FIG. 8 above) that can include a sliding operating rod 138 to move the moving contact 118 in or out of the opening contact 122 and connect or disconnect the first and second power lead 124, 126. Thus, switching on or off the power supply to the electronic device.

The polymer 114 can be the polymer insulating material described above. The polymer insulating material can be liquid silicone rubber. The polymer insulating material 114 can be coupled to the interior walls of the housing 110 and/or the outer surface of the current-breaking component 116 and conductors 30, 42. It can surround the switch 112, including the interrupter 116 and the moving contact 118. According to embodiments presented herein, the polymer insulating material 114 can further surround the sliding operating rod 138. As shown schematically in FIG. 9, the polymer insulating material 114 can further surround a first and second conductor 134, 136 (described below).

The high-voltage switch can further include a first bushing 130 and second bushing 132. The first bushing 130 can include the first conductor 134 that couples the fixed contact 120 to a first power lead 124 (or first bushing top cap that connects to the first power lead). The second bushing 132 can include the second conductor 136 that couples the moving contact 118 to the second power lead 126 (or second bushing top cap that connects to a second power lead). According to embodiments shown schematically in FIG. 9, the first and/or second bushing 130, 132 can be separable from the housing 110 (as shown in FIG. 1 and described above).

According to embodiments presented herein, the switch 112 can be part of a high-voltage circuit breaker that is activated when there is an over-current detected. In one embodiment, the actuating mechanism 128 can be activated to disconnect the moving contact 118 from the opening contact 122. In another embodiment, the switch 112 can be part of a high-voltage switch that is activated by a user or other device. In such an embodiment, the actuating mechanism 128 can be activated to connect or disconnect the moving contact 118 to or from the opening contact 122.

According to embodiments presented herein, the polymer 114 can include electrical grade silicone rubber, silicone rubber foams, urethanes, urethane foams, epoxies, epoxy foams, or a blend of these materials. The urethanes and epoxies can include rigid, semi flexible, or flexible with or without insert fillers. The polymer 114 can further include liquid castable thermoset plastics that cure after mixing with heat or room temperature. The polymer 114 can have a high dielectric strength with a low dielectric constant, it can be void free and able to bond well to metal surfaces with or without primer. Additionally, the polymer material 114 can be low cost, easy to process large castings, flame retardant and have low shrinkage.

Figure 10:
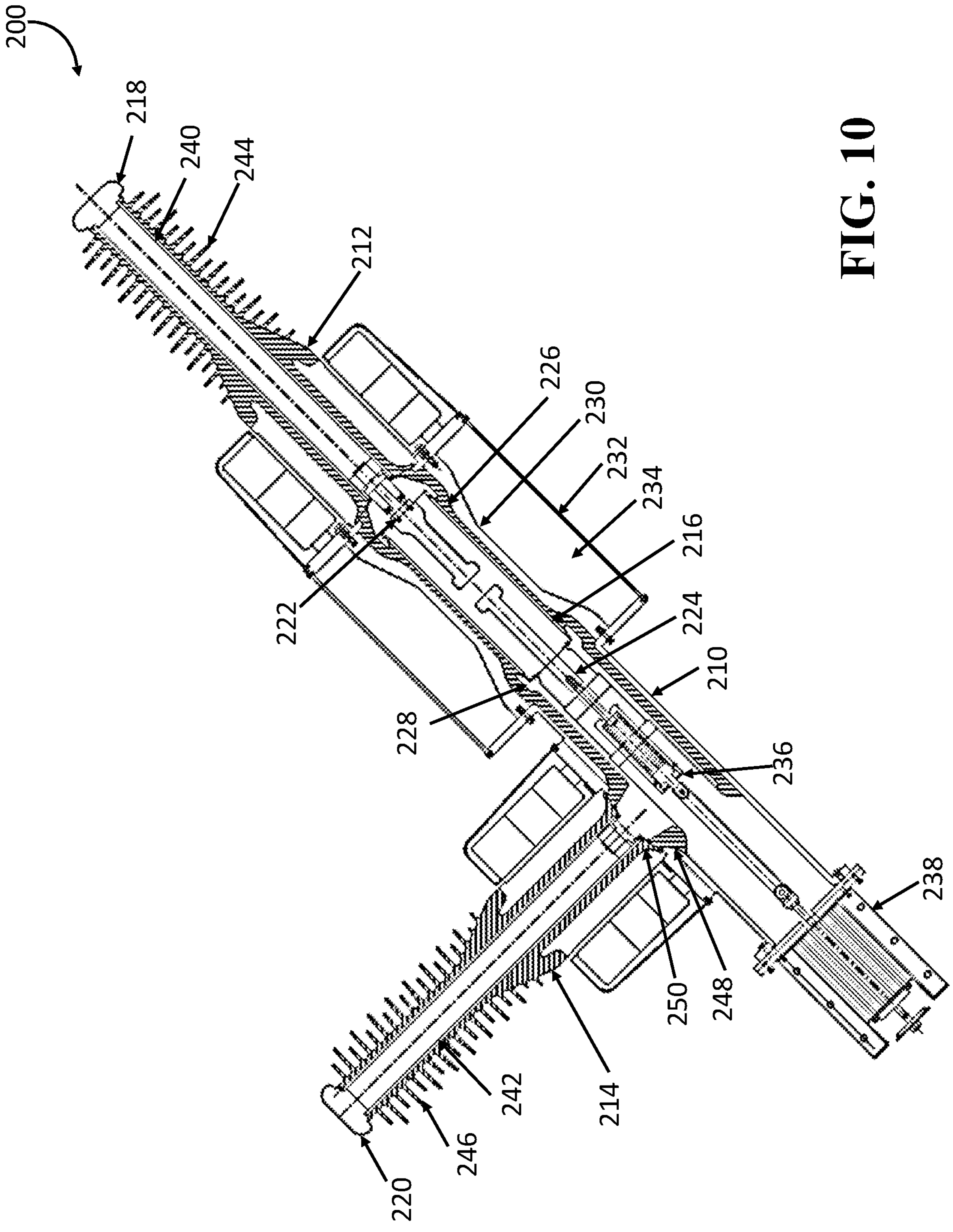
FIG. 10 is a perspective cross-section view illustrating a high-voltage switch, according to an embodiment.

FIG. 10 illustrates a high-voltage switch 200. According to example embodiments shown schematically in FIG. 10, the high-voltage switch 200 can include a housing 210, a first bushing 212, a second bushing 214, a vacuum interrupter 216, a first power lead 218 (connected through a cap), a second power lead 220 (connected through a cap), a fixed contact 222, a contact opening 224, a polymer insulating material 226, a high-voltage dielectric shield 228, a rigid insulating support 230, a grounded shield 232, an air gap 234, a sliding operating rod 236, an actuating mechanism 238, a first conductor 240, a second conductor 242, a first shed 244, a second shed 246, a first housing polymer insulating connector 248, and a second housing polymer insulating connector 250.

In an embodiment, vacuum interrupters may include a dielectric shield to protect the brazing/welding at the end of the vacuum interrupter. The dielectric field strength may be too high for air at standard temperature and pressure (STP). The polymer may protect the shield and vacuum interrupter from high dielectric fields.

In an embodiment, covering the vacuum interrupter body in polymer may allow for protecting the vacuum interrupter from high dielectric field strength on the surfaces since the polymer may have a dielectric strength about 7 times greater than air at STP. The polymer may also reduce the strength of the dielectric field on the surface of the polymer to a value that the air can withstand.

In another embodiment, air pressurized can be used at less than 1 atm, to avoid entanglements in ASME pressure vessel code. Additionally, a vacuum can be used.

In an embodiment, many gases can be used to replace air. Nitrogen, oxygen, carbon dioxide or others can be used instead of air. In such a case, the containers must be sealed. In an embodiment, air can be used with a filtered vent to avoid full sealing of the device.

In an embodiment, the air gap 234 can be approximately a 150 mm distance between ground shield 232 and the interrupter 216 to allow the electric field lines to form the proper shape. In an embodiment, the ground shield 232 can be approximately 7 inches from the surface of the interrupter 216.

In an embodiment, the polymer insulating material can be connected to the housing or vacuum interrupter, for example, just prior to molding the adhesion surfaces can be sandblasted and coated with a proprietary primer. This combination can be used to activate the surfaces to enhance the bond between the polymer and the surfaces. The molding process can be performed by vacuum mixing of the polymer and vacuum mold filling to avoid air bubbles that will cause electric field problems. Depending upon which polymer is selected, the cure of the polymer will be either a room temperature cure or a heated cure in an oven.

In an embodiment, the bushings can be made out of a polymer insulating material casing where no insulating air is needed and therefore no monitoring of gas pressure to maintain dielectric properties. The polymer can perform as a solid insulation replacing the pressurized air of other designs. The polymer can be approximately 20 mm thick and provide all of the insulation necessary to provide dielectric strength for all of the ANSI requirements for circuit breakers and overall switch designs.

In an embodiment, the current carrying conductor can be aluminum or copper and can be filled with air at STP or can be sealed and evacuated. For the polymer in the bushing, a mold can be made over the conductor and a primer can be used as a coating before vacuum molding. The bushing can have a cast aluminum grounded housing that allows the installation and insulation of the bushing current transformer.

In an embodiment, the actuating mechanism 238 can be an EPS magnetic latch mechanism.

Figure 11:
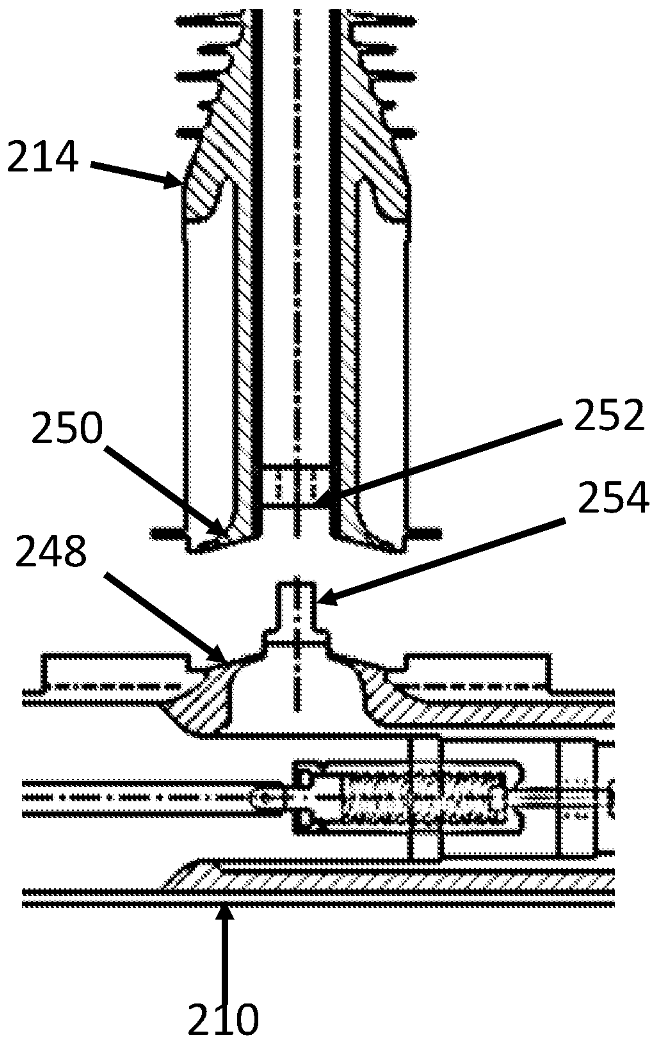
FIG. 11 is a detail cross-section diagram of the bushing connector of FIG. 10.

FIG. 11 is a detail cross-section diagram of the bushing connector of FIG. 10. According to example embodiments shown schematically in FIG. 11, the high-voltage switch 200 can include the first housing polymer insulating connector 248, the second housing polymer insulating connector 250, a second housing connector 252, and a first housing connector 254. The first housing connector 254 can connect with the second housing connector 252 to connect the first housing 210 with the second housing 214. The first housing polymer insulating connector 248 and the second housing polymer insulating connector 250 can connect to provide insulation when the housings are connected and operating.

In an embodiment, the separable polymer to polymer silicone joint can be connected under vacuum to keep air out of the joint.

Figure 12:
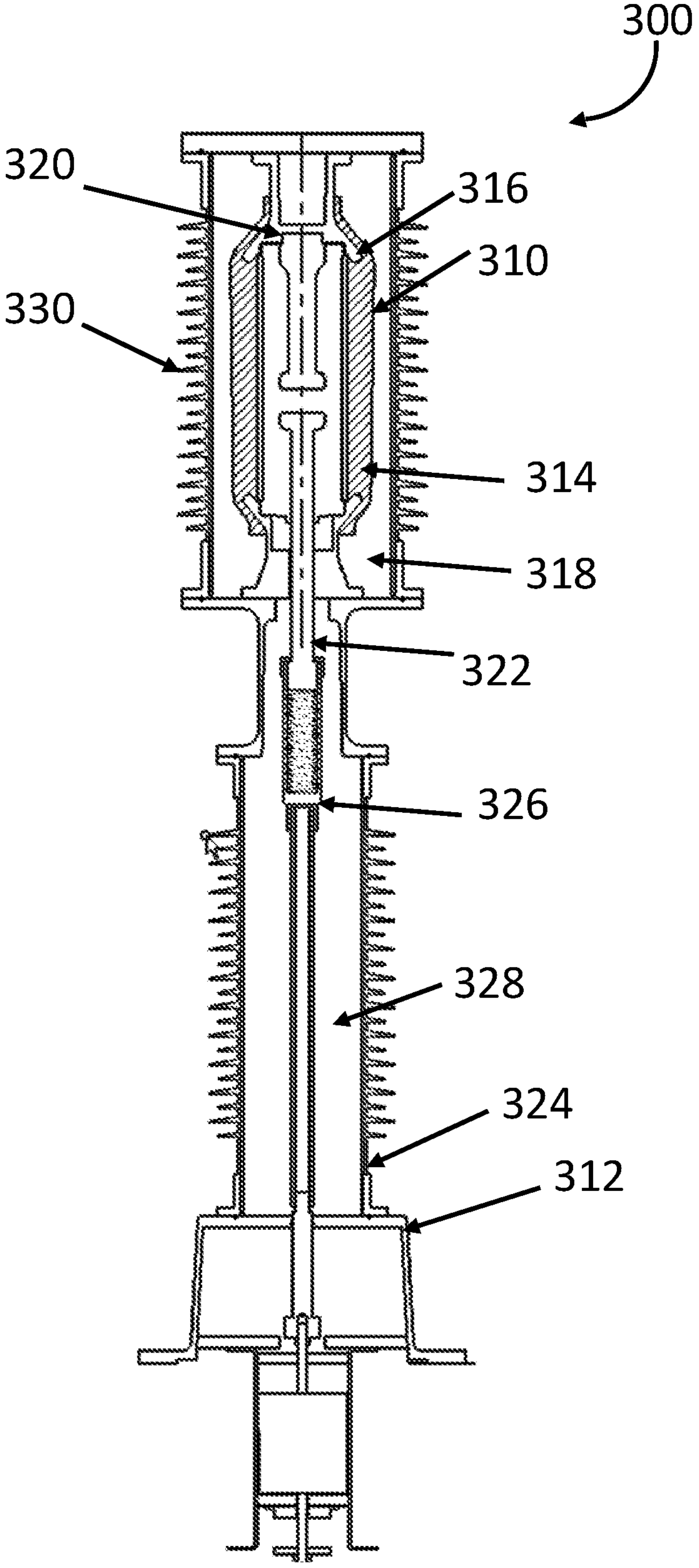
FIG. 12 is a perspective cross-section view illustrating a live tank, according to an embodiment.

FIG. 12 illustrates a high-voltage switch 300. According to example embodiments shown schematically in FIG. 12, the high-voltage switch 300 can include a vacuum interrupter 310, an actuating mechanism 312, a polymer insulating material 314, a high-voltage dielectric shield 316, an air gap 318, a fixed contact 320, a moving contact 322, an earth ground 324, a sliding operating rod 326, an air gap 328, and a shed 330.

Competitive Considerations

For 50 years the state of the art in high voltage circuit breakers has been $SF_6$ for interruption and insulation performance. Currently, the new state of the art in $SF_6$ free high voltage circuit breakers consists of a vacuum interrupter in a dead tank configuration with air insulation. Meiden America Switchgear offers the MAS 7242 and MAS 7243 products. Siemens Energy has recently offered the 3AV1 Blue 72.5 kV, 3AV1 Blue 123 kV and 3AV1 Blue 145 kV with clean air insulation. Mitsubishi Electric Power Products, Inc. is offering the 72 kV Vacuum Circuit Breaker with air insulation. This design requires two different pressures per tank with a total of 6 gages. All of these companies are foreign companies with a heavy reliance on China for critical components.

Traditionally, a 72.5 kV $SF_6$ dead tank circuit breaker with bushing current transformers sells for $32,000 (before the supply chain crisis). Today the 72.5 kV air insulated vacuum interrupter dead tank breakers sell for a premium above the price of the $SF_6$ breakers. This premium price has limited utility acceptance. The new product will cost less and more importantly, can sell for 5 to 10% less than either of the existing $SF_6$ or vacuum/air products, helping to drive the acceptance of this product.

The transition from the grounded tank to the air insulated bushing through to the high voltage in air terminal must be designed, developed and tested to withstand the dielectric challenges.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A device comprising:

a first housing, wherein the first housing is at ground potential;

a switch, wherein the switch is located within the first housing and comprises:

a current-breaking component with a fixed contact and an opening contact, wherein the fixed contact is coupled to a first power lead and wherein the opening contact is configured to receive a moving contact, and the moving contact, wherein the moving contact is coupled to a second power lead and is controlled by an actuating mechanism;

a polymer insulating material, wherein the polymer insulating material surrounds the switch within the first housing;

a grounded shield, wherein the grounded shield surrounds at least the current-breaking component; and an air gap between the polymer insulating material and the grounded shield, wherein the polymer insulating material is coupled to an outer surface of the current-breaking component.

2. The device of claim 1, wherein the current-breaking component comprises a vacuum interrupter controlled by the actuating mechanism.

3. The device of claim 1, further comprising:

a high voltage dielectric shield surrounding the fixed contact and opening contact of the current-breaking component.

4. The device of claim 1, wherein the polymer insulating material is void free.

5. The device of claim 1, wherein the polymer insulating material comprises liquid silicone rubber.

6. The device of claim 1, wherein the air gap comprises an atmospheric pressure air gap.

7. The device of claim 1, wherein the switch comprises a circuit breaker configured to protect electrical equipment from overcurrent.

8. A system comprising:

a first housing, wherein the first housing is at ground potential;

a first bushing coupled to a first power lead;

a second bushing coupled to a second power lead;

a switch, wherein the switch is located within the first housing and comprises:

a current-breaking component with a fixed contact and an opening contact, wherein the fixed contact is coupled to the first power lead through the first bushing, and wherein the opening contact is configured to receive a moving contact, and the moving contact, wherein the moving contact is coupled to a second power lead through the second bushing and is controlled by an actuating mechanism;

a polymer insulating material, wherein the polymer insulating material surrounds the switch and the moving contact within the first housing;

a grounded shield, wherein the grounded shield surrounds at least the current-breaking component; and an air gap between the polymer insulating material and the grounded shield, wherein the polymer insulating material is coupled to an outer surface of the current-breaking component.

9. The system of claim 8, wherein the second bushing comprises a second housing at ground potential.

10. The system of claim 9, wherein the second housing comprises a polymer insulating material connected to inner walls of the second housing.

11. The system of claim 10, wherein the second bushing comprises a flange configured to separate the second housing from the first housing.

12. The system of claim 11, wherein the second bushing comprises a polymer insulating connecting point configured to insulate a connection between the second housing and the first housing.

13. The system of claim 8, wherein the current-breaking component comprises a vacuum interrupter controlled by the actuating mechanism.

14. The system of claim 8, further comprising:

a high voltage dielectric shield surrounding the fixed contact and opening contact of the current-breaking component.

15. The system of claim 8, wherein the polymer insulating material comprises liquid silicone rubber.

16. The system of claim 8, wherein the first and second housing comprise the polymer insulating material.

17. A method, comprising:

providing a high voltage electrical current through a grounded housing, wherein the grounded housing comprises:

a first and second power lead coupled to a power supply, a switch comprising:

a current-breaking component with a fixed contact and an opening contact, wherein the fixed contact is coupled to the first power lead and wherein the opening contact is configured to receive a moving contact, and the moving contact, wherein the moving contact is coupled to the second power lead and is controlled by an actuating mechanism, a polymer insulating material, wherein the polymer insulating material surrounds the switch and the moving contact within the housing;

a grounded shield, wherein the grounded shield surrounds at least the current-breaking component; and an air gap between the polymer insulating material and the grounded shield, wherein the polymer insulating material is coupled to an outer surface of the current-breaking component determining an overcurrent occurs between the first and second power lead; and switching off the high voltage electrical current using the switch.

18. The method of claim 17, wherein the current-breaking component comprises a vacuum interrupter controlled by the actuating mechanism and wherein the polymer insulating material comprises liquid silicone rubber.

* * * * *